(12) United States Patent  Fife

(10) Patent No.: US 9,505,352 B2
(45) Date of Patent: Nov. 29, 2016

(54) VEHICULAR GUN REST

(71) Applicant: Robbie D. Fife, Mountain Home, TX (US)

(72) Inventor: Robbie D. Fife, Mountain Home, TX (US)

(73) Assignee: GUNNER FAB, LLC, Kerrville, TX (US)

( * ) Notice: Subject to any disclaimer, the term of this patent is extended or adjusted under 35 U.S.C. 154(b) by 331 days.

(21) Appl. No.: 13/987,896

(22) Filed: Sep. 12, 2013

(65) Prior Publication Data

US 2015/0069103 A1    Mar. 12, 2015

(51) Int. Cl.
*F41C 33/00* (2006.01)
*B60R 9/00* (2006.01)
*B60R 7/14* (2006.01)
*F41C 33/06* (2006.01)

(52) U.S. Cl.
CPC ............... *B60R 7/14* (2013.01); *F41C 33/002* (2013.01); *F41C 33/06* (2013.01)

(58) Field of Classification Search
CPC ...... B60R 7/14; F41C 33/002; F41C 33/003; F41C 23/02; F41C 33/06
USPC ............... 224/555, 149, 913, 533; 206/317
See application file for complete search history.

(56) References Cited

U.S. PATENT DOCUMENTS

| | | | |
|---|---|---|---|
| 2,116,443 A | 5/1938 | McMillen | |
| 2,248,170 A | 7/1941 | Hansen | |
| 2,692,069 A * | 10/1954 | Winters | A47B 81/005 211/64 |
| 2,750,088 A * | 6/1956 | Agostini | A47B 81/005 211/64 |
| 3,138,994 A * | 6/1964 | Blunk | B64D 7/02 224/401 |

(Continued)

*Primary Examiner* — Nathan J Newhouse
*Assistant Examiner* — Lester L Vanterpool
(74) *Attorney, Agent, or Firm* — G. Turner Moller

(57) ABSTRACT

A firearm rack is mounted on door hardware in the door opening of a vehicle in which the door has been removed. The firearm rack may be mounted in sockets provided by a door hinge half connected to the vehicle. A brace may be provided to prevent rotation of the firearm rack. The firearm rack may be fixed to door hardware exposed by removal of the door, such as the sockets, the hinge plates or the screw openings of the door opening. The firearm rack may be inboard of the outside of the vehicle.

12 Claims, 2 Drawing Sheets

(56) References Cited

U.S. PATENT DOCUMENTS

| | | | | |
|---|---|---|---|---|
| 3,175,696 A | * | 3/1965 | Milbourne | A47G 25/06 16/223 |
| 3,556,363 A | * | 1/1971 | Whittaker | B60R 7/14 224/546 |
| 3,876,078 A | * | 4/1975 | Gomes | A47B 81/005 211/64 |
| 4,057,180 A | * | 11/1977 | Whittaker | B60R 7/14 211/64 |
| 4,070,056 A | | 1/1978 | Hickman | |
| 4,818,088 A | | 4/1989 | Sacknoff | |
| 4,936,531 A | * | 6/1990 | Bauser | B60N 3/00 211/64 |
| 5,012,606 A | * | 5/1991 | McNulty | A47B 81/005 361/194 |
| 5,505,317 A | | 4/1996 | Rulis | |
| 5,516,073 A | | 5/1996 | McMahan | |
| 5,680,939 A | * | 10/1997 | Oliver | F41A 23/18 211/64 |
| 6,129,252 A | | 10/2000 | Jackson | |
| 6,935,065 B1 | * | 8/2005 | Oliver | F41A 23/04 211/64 |
| 6,986,446 B2 | * | 1/2006 | Murray | B60R 7/14 211/64 |
| 7,124,530 B1 | | 10/2006 | Clark | |
| 7,137,511 B1 | * | 11/2006 | Crowell | F41A 23/18 211/4 |
| 7,267,384 B1 | | 9/2007 | Coviello | |
| 7,676,978 B2 | | 3/2010 | Marlatt | |
| 7,980,345 B1 | * | 7/2011 | Harvey | B60N 2/24 180/90.6 |
| 2001/0114687 | | 5/2011 | Wellborn | |
| 2011/0114687 A1 | * | 5/2011 | Wellborn | B60R 7/14 224/401 |
| 2011/0198375 A1 | | 8/2011 | Bennett | |
| 2013/0269509 A1 | * | 10/2013 | Irwin | F41A 23/005 89/37.01 |

* cited by examiner

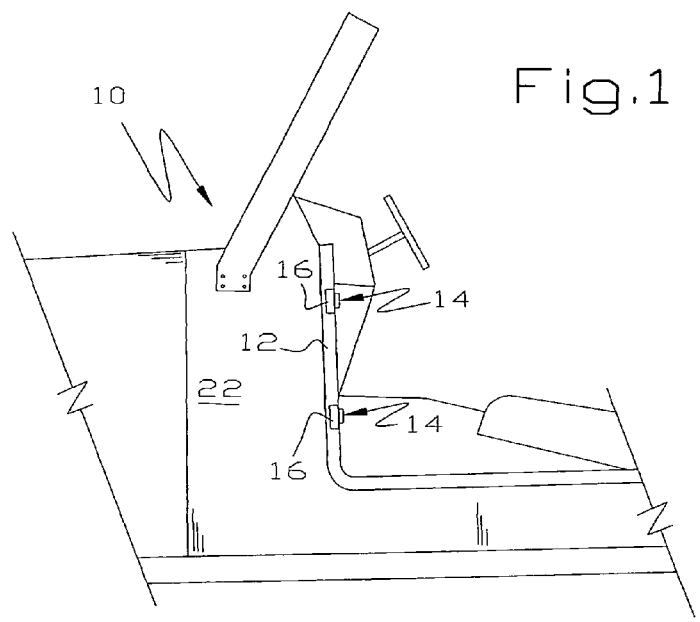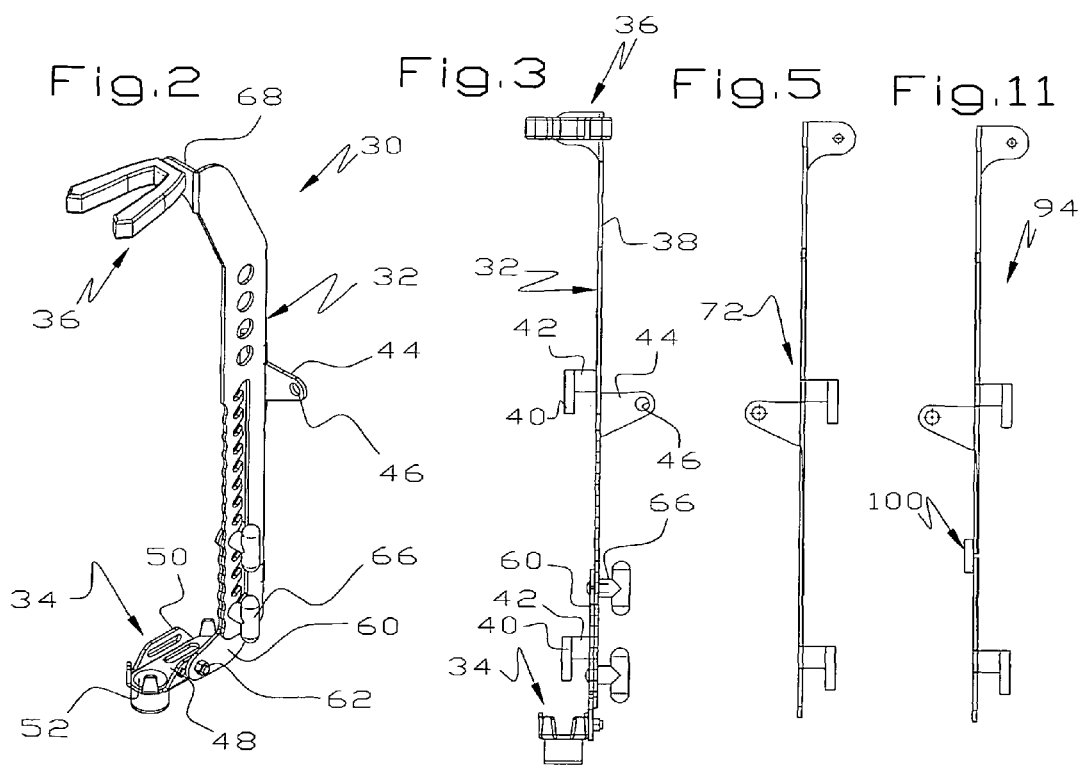

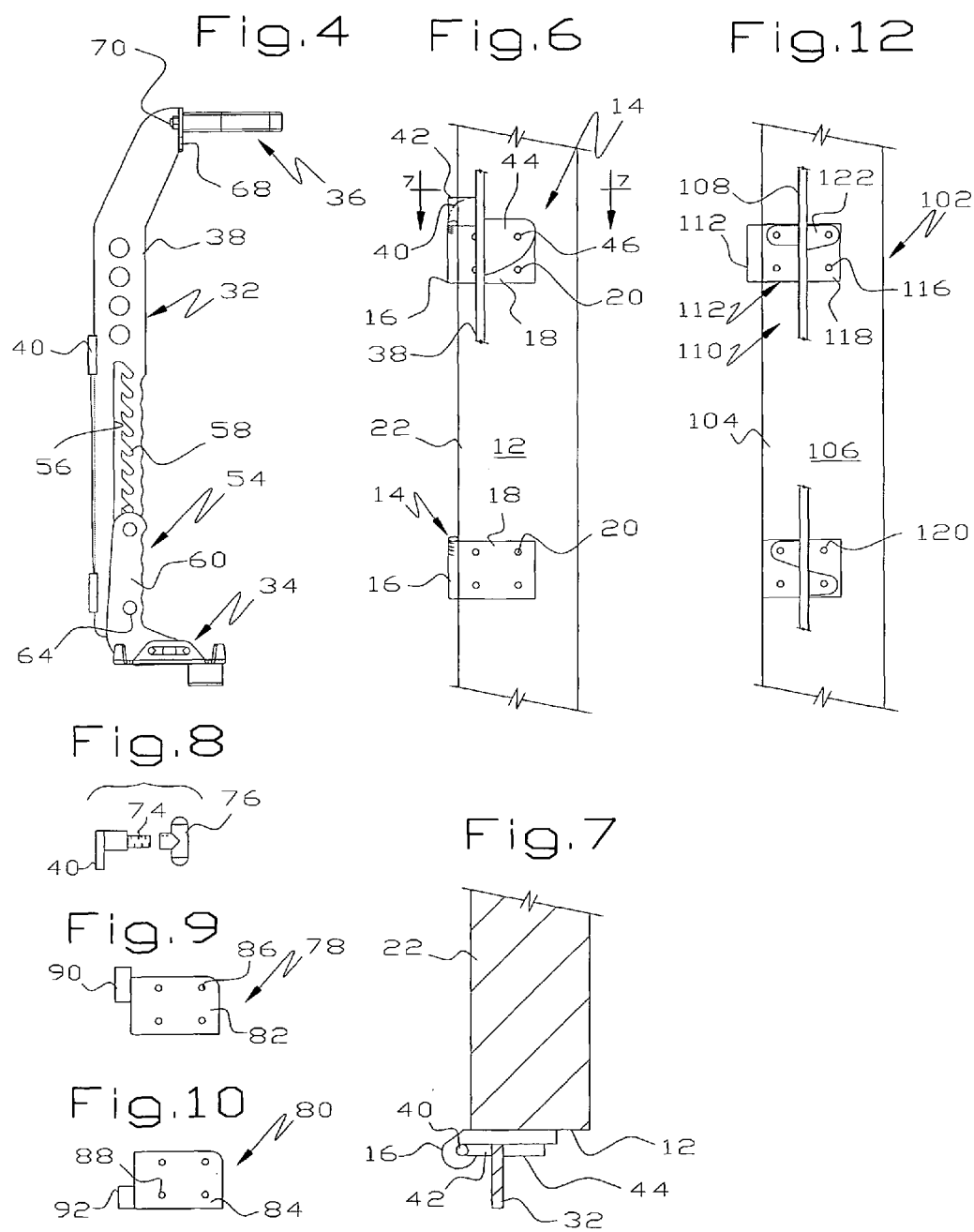

VEHICULAR GUN REST

This application is based on provisional patent application Ser. No. 61/743,949, filed Sep. 13, 2013, priority of which is hereby claimed.

This invention relates to a gun rack for a utility vehicle where one or more doors have been removed.

BACKGROUND OF THE INVENTION

Military style utility vehicles were originally made by Willys and other manufacturers during World War II. Similar vehicles are now made by Chrysler Corporation under the trademark JEEP. These and similar vehicles are often used in hunting. Often, the doors are removed improving access into and out of the vehicle.

Hunting vehicles are often provided with gun racks to hold rifles and/or shotguns. A special purpose gun rack has been made for military style utility vehicles which attaches to the dashboard holding a rifle perpendicular to the direction of travel of the vehicle. This type gun rack is made by Omix-Ada, Inc. of Suwanee, Ga. as model 12021.68 and sold by discountjeepparts.com.

Disclosures of some interest relative to this invention are found in the following U.S. Pat. Nos. 2,116,443; 2,248,170; 3,175,696; 3,876,078; 4,818,088; 5,012,606; 5,505,317; 5,516,073; 5,680,939; 6,129,252; 6,935,065; 7,124,530 and 7,676,978 and U.S. Printed Patent Applications 2011/0114687 and 2011/0198375.

SUMMARY OF THE INVENTION

As disclosed herein, at least one door is removed from a vehicle such as a military style utility vehicle or a JEEP providing improved access to and from the vehicle interior. This exposes the sockets on the outside of the vehicle which normally support pins or pintles carried by the door. In some embodiments, a gun rack having a pair of spaced pins matching the size and spacing of the door pintles is provided. The gun rack pins are inserted into the vehicle sockets after the door is removed. To prevent the gun rack from pivoting in the sockets in the same manner as the door pivots, a connection may be made to the vehicle frame thereby immobilizing the gun rack. A preferred connection may be a strut or ear overlying a hinge half on the door frame. A screw may be removed from the hinge half, the strut may be placed over the hinge half and a screw inserted through the strut and hinge half. In some embodiments, the gun rack comprises a upright standard which is may preferably be inboard of the outside of the vehicle such as inboard of a plane perpendicular to the ground and abutting an outside of the vehicle.

In some embodiments, provisions are made to provide a gun rack for other vehicles, i.e. to accommodate a difference in the vertical spacing of the hinges. In some embodiments, the gun rack may attach directly to the door hinge in a somewhat different manner.

It is an object of this invention to provide an improved gun rack for a vehicle.

Another object of this invention is to provide a gun rack for a vehicle which is supported by the door hardware of the vehicle.

These and other objects and advantages of this invention will become more fully apparent, reference being made to the accompanying drawings.

BRIEF DESCRIPTION OF THE DRAWINGS

FIG. 1 is a partial pictorial view of a utility vehicle having both doors removed;

FIG. 2 is an isometric view of a driver's side gun rack;

FIG. 3 is a rear view of the driver's side gun rack of FIG. 2;

FIG. 4 is a view of one side of the driver's side gun rack of FIGS. 2-3;

FIG. 5 is a rear view of the upright of a passenger's side gun rack, comparable to FIG. 3;

FIG. 6 is a partial enlarged view of a driver's side door frame, hinge half and socket of FIG. 1 illustrating the relation-ship between the gun rack and vehicle;

FIG. 7 is a cross-sectional view of FIG. 6, taken substantially along line 7-7 thereof, as viewed in the direction indicated by the arrows;

FIG. 8 is an exploded view of an adjustably mountable pin so a gun rack may be attached to vehicles having hinges of different spacing;

FIGS. 9 and 10 are similar custom hinge plate assemblies providing another technique for attaching a gun rack to vehicles having hinges of different spacing;

FIG. 11 is a view similar to FIG. 5 showing a passenger side upright support with a vertical adjustment providing another technique for attaching a gun rack to vehicles having hinges of different spacing; and FIG. 12 is a view, similar to FIG. 6, illustrating another technique for attaching a gun rack to a vehicle door opening.

DETAILED DESCRIPTION OF THE INVENTION

Referring to FIGS. 1-7, one or more doors of a vehicle 10 have been removed providing easy entrance and exit from the vehicle 10. Removal of the doors leaves a door frame 12 and door hardware such as a pair of vertically spaced hinge halves or assemblies 14 having sockets or barrels 16 which normally receive pintles (not shown) of the door. Typically, the assemblies 14 include a support plate 18 attached to the door frame 12 by screws 20 which pass through the plate 18 and thread into openings (not shown) in the door frame 12. The vehicle 10 may be of any suitable type such as a military style utility vehicle, a JEEP, a pickup truck, SUV, van, automobile, all terrain vehicle, utility type vehicle or the like which includes socket type door hinges or which can be modified to include a door type socket when the original equipment door has been removed. Many utility type vehicles include generally planar vertical sides 22 and those that do not have vertical sides inherently define a vertical plane abutting the exterior vehicle side.

A gun or firearm rack 30 may be installed in the sockets 16 providing a support for a rifle, shotgun or other long firearm. The rack 30 may comprise, as major components, an upright support 32, a butt support 34 and a hand grip support 36.

As shown best in FIGS. 2-4, the upright support 32 may be made of any suitable material such as plastic or composite materials or the like but preferably may be of metal. The upright 32 may include a central bar 38 having a pair of pins or pintles 40 of the same diameter, length and spacing as the pintles of the door which has been removed so the upright 32 may be installed in the sockets 16 remaining on the vehicle 10. The pins 40 connect to and are spaced from the bar 38 or strut 42. The central bar 38 may be perforated to reduce weight, provide a design feature or for other purposes. The bar 38 may also include an ear or strut 44 to immobilize and support the upright 32 as pointed out hereinafter. The strut 44 may provide a passage 46 therethrough for purposes more fully apparent hereinafter.

The butt support 34 is attached to, or forms part of, a lower section of the upright 32 and may include a horizontal section 48 bounded by one or more lips 50 to receive and retain the butt of a firearm. In addition, the section 48 may include a recess 52 having a bottom to supportingly receive the muzzle of a firearm in the event the user desires to position a weapon muzzle down in the gun rack 30.

In some embodiments, the upright 32 may include a technique to adjust the distance between the butt support 34 and the hand grip support 36 so the gun rack 30 can accommodate firearms of considerably different length. To this end, the upright 32 may cooperate with the butt support 34 and/or the hand grip support 36 to provide a height adjuster 54. As illustrated, the height adjuster 54 may include an elongate upright slot 56 intersecting a series of parallel downwardly inclined slots 58.

The height adjuster 54 also includes a support arm 60 connected to the butt support 34 in any suitable manner, as by a nut and bolt assembly 62. An upper end of the support arm 60 may be adjustably mounted in any one of the slots 58 by the provision of a pair of threaded members 64, such as carriage bolts, to which are threaded suitable nuts 66, such as threaded T-handles. It will be apparent that any height adjustment feature of suitable strength is operative.

The hand grip support 36 may be of any suitable type and conveniently may be of a commercially available type, such as is available from Kolpin Powersports of Fox Lake, Wis. The hand grip support 36 may connect to the upright 32 in any suitable manner, as by providing an offset bracket 68 to which the support 36 connects by provision of a threaded member 70.

To mount the gun rack 30 on the driver's side of the vehicle 10, the existing door is removed leaving the sockets 16. One of the screws 20 connecting the support plate 18 to the door frame 12 may be removed. The pins 40 of the gun rack 30 are inserted into the sockets 16 and the upright 32 adjusted so the opening 46 in the ear or strut 44 aligns with the threaded passage of the removed screw 20. The removed screw, or a longer one of the same thread characteristics, is inserted into and tightened thereby captivating the gun rack 30 to the door frame 12 and preventing pivoting of the upright 32 about an axis through the sockets 16. It will thus be seen that the gun rack 30 may be supported by the sockets 16 or may be supported mainly from the plate 18.

As shown in FIG. 6, the ear 44 overlies the support plate 18 and the pins 40 come to rest in the sockets 16 so that the upright bar 38 is either inboard or substantially coplanar with the vehicle sides 22. This has an advantage because it positions the firearm supported in the gun rack 30 reasonably far inboard, meaning it is less prone to be damaged by accidental contact with limbs or branches and the like while the vehicle 10 is driving in brush. In addition, the gun rack 30 is largely protected against impact from brush or the like.

The device illustrated in FIGS. 1-4, 6 and 7 is a driver's side version. FIG. 5 shows a passenger's side upright 72 which is a mirror image of the driver's side upright 32. A passenger side gun rack is installed in the same manner.

Although the pins 40 are illustrated in FIGS. 2-4 as being fixed to the upright 32, one or both of the pins 40 may be adjustably mounted on the upright 32 in order to accommodate vehicles where the sockets 16 are of different spacing. Any suitable adjustment for one or both of the pins 40 is satisfactory, such as a vertical and diagonal slot arrangement similar to slots 56, 58. In the alternative, as shown in FIG. 8, one of the pins 40 may provide a threaded end 74 for connection to a T-handle 76 so the pin 40 may be vertically adjusted to one of the unused diagonal slots 58 and thereby adjust the vertical spacing between the pins so the gun rack may be attached to vehicles other than the standard military style JEEP.

Another approach for accommodating a different vertical spacing between hinges is shown in FIGS. 9 and 10 where custom hinge halves 78, 80 include hinge plates 82, 84 having screw openings 86, 88 in positions to accommodate a particular vehicle. Each of the hinge halves 78, 80 include sockets or barrels 90, 92 sized to receive the pins 40 of the gun rack 30 but the barrels 90, 92 are spaced differently, relative to the hinge plates 82, 84. It will be seen that this is another technique to accommodate a difference in vertical spacing of doors of other vehicles.

In another alternative, as shown in FIG. 11, an upright support 94 may be split into two sections 96, 98 with an adjustment 100, such as a screw thread adjuster or turnbuckle, connecting the sections 96, 98 together.

Referring to FIG. 12, there is illustrated a vehicle 102 from which one or more doors have been removed leaving a door opening 104 and a door frame 106. Instead of mounting an upright 108 of a gun rack 110 in the socket or barrel 112 of a hinge plate assembly or hinge half 114, the upright 108 may be mounted in door hardware such as the screw openings 116 in the hinge plate 118 as in the upper part of FIG. 12 or in screw openings 120 in the door frame 106, after a hinge plate assembly has been removed, as in the lower part of FIG. 12. In this situation, the upright 108 is supported entirely through ears 122, 124 so they may preferably be large enough to pass screws (not shown) through two screw openings 116, 120.

Although this invention has been described in its preferred forms with a certain degree of particularity, it is understood that the present disclosure is only by way of example and that numerous changes in the details of operation and the combination and arrangement of parts may be resorted to without departing from the scope of the claims which are the sole measure of the invention.

I claim:

1. A firearm rack to fit into the door hinge sockets of a vehicle comprising
   an upright including
      at least two spaced apart pins sized to be received in a door hinge socket of the vehicle,
      a lower end support configured to receive one end of a firearm,
      an upper end support configured to receive an opposite end of the firearm, the upper and lower end supports being configured to mount the firearm in an upright orientation inboard of an outer side of the vehicle,
      an adjustment between the upper and lower end supports modifying vertical spacing between the upper and lower end supports to accommodate firearms of different length, and
      a brace having one brace end rigid with the upright, a second brace end and a fastener configured to affix the second brace end to the vehicle, the brace being configured to prevent the upright from pivoting in the door hinge sockets,
   the upright being configured to position the upper end support above the lower end support in an upright orientation,
   the firearm rack further comprises means for adjusting vertical spacing between the pins independently of adjustment between the upper and lower end supports.

2. The firearm rack of claim 1 wherein the lower end support includes a first flat support area to receive a firearm butt and a recess having a second flat support area separate from the first flat support area and having an upwardly opening closed wall intersecting the second flat support area, the upwardly opening closed wall being configured to receive a firearm muzzle.

3. The firearm rack of claim 2 wherein the second support area of the recess is below the first support area and the closed wall is circular.

4. In combination, a vehicle comprising at least one door frame providing a door opening allowing entrance and exit from the vehicle, door hardware in the opening including at least two hinge sockets and a firearm rack supported from the door hardware, the firearm rack comprising an upright including pins in the at least two hinge sockets, a lower end support to receive one end of a firearm and an upper end support, above the lower end support, the upper and lower end supports being configured to receive opposite ends of the firearm in a vertical orientation, the upper and lower end supports being disposed wholly in the door opening and configured to mount the firearm inboard of an outer side of the vehicle, the upright being configured to provide an adjustment between the upper and lower end supports modifying vertical spacing between the upper and lower end supports to accommodate firearms of different length, and means for adjusting vertical spacing between the pins independently of adjustment between the upper and lower end supports.

5. The combination of claim 4 wherein the door hardware comprises a hinge plate having therein a plate opening to receive a fastener and the firearm rack comprises a fastener received in the plate opening.

6. The combination of claim 4 wherein the door hardware comprises a threaded opening in the door frame and the firearm rack comprises a member threaded into the door frame opening.

7. The combination of claim 4 wherein the upright lies inboard of the outer side of the vehicle.

8. The combination of claim 4 further comprising a brace having one end rigid with the upright, a second end and a fastener affixing the brace to the vehicle to prevent the upright from pivoting in the door hinge sockets.

9. The combination of claim 8 wherein the door hardware includes a hinge plate and the brace is connected to the hinge plate.

10. In combination, a vehicle comprising at least one door frame providing an opening allowing ingress and egress from the vehicle, a pair of vertically spaced hinge halves each having a member attached to the door frame and a socket outboard of the door frame adapted to receive a pair of door pintles of a door closing the opening and a firearm rack supported in the sockets of the vehicle comprising an upright, a lower end support to receive one end of a firearm and an upper end support to receive an opposite end of the firearm, the lower end support includes a first flat support area to receive a firearm butt and a recess having a second flat support area separate from the first flat support area and having an upwardly opening closed wall intersecting the second flat support area, the upwardly opening closed wall being configured to receive a firearm muzzle, the upright including a pair of pins received in the sockets, the upper and lower end supports being relatively adjustable toward/away from each other to accommodate firearms of different length, the upper and lower end supports being configured to mount the firearm in an upright orientation inboard of an outer side of the vehicle, the upright being configured to fix the upper and lower supports against pivotal movement.

11. The combination of claim 10 wherein the pins are adjustable toward/away from each other to accommodate door sockets of different spacing and the upper and lower end supports being configured to adjust toward and away from each other independently of adjustable movement of the pins.

12. The combination of claim 10 wherein the upright includes a brace having one end rigid with the upright, a second end and a fastener affixing the brace to the vehicle to prevent the upright from pivoting in the sockets.

* * * * *